US009041386B2

(12) United States Patent
Goetz

(10) Patent No.: US 9,041,386 B2
(45) Date of Patent: May 26, 2015

(54) LINEAR POSITION MEASURING SYSTEM AND METHOD FOR DETERMINING THE POSITION OF A CARRIAGE IN RELATION TO A SLIDE RAIL WITH AN INCREMENTAL SCALE PLACED ALONG THE SLIDE RAIL AND A SCANNER SECURED TO THE SLIDE SCALE

(75) Inventor: Klaus-Dieter Goetz, Sersheim (DE)

(73) Assignee: SCHNEEBERGER HOLDING AG, Roggwil (CH)

( * ) Notice: Subject to any disclaimer, the term of this patent is extended or adjusted under 35 U.S.C. 154(b) by 195 days.

(21) Appl. No.: 13/484,576

(22) Filed: May 31, 2012

(65) Prior Publication Data

US 2012/0313630 A1   Dec. 13, 2012

(30) Foreign Application Priority Data

Jun. 10, 2011   (EP) .................................. 11405269

(51) Int. Cl.
| | |
|---|---|
| G01B 7/14 | (2006.01) |
| G01D 5/36 | (2006.01) |
| G01D 5/245 | (2006.01) |
| F16C 29/00 | (2006.01) |
| F16C 41/00 | (2006.01) |

(52) U.S. Cl.
CPC . G01D 5/36 (2013.01); *F16C 29/00* (2013.01); *F16C 41/007* (2013.01); G01D 5/2451 (2013.01)

(58) Field of Classification Search
USPC ....................................................... 324/207.24
See application file for complete search history.

(56) References Cited

U.S. PATENT DOCUMENTS

2005/0189938 A1   9/2005   Schley et al.

FOREIGN PATENT DOCUMENTS

DE   10303795 A1   8/2004

OTHER PUBLICATIONS

European Search Report issued on Nov. 28, 2011, which is enclosed without an English Translation, that issued in the corresponding European Patent Application No. 11405269.9.

*Primary Examiner* — Jay Patidar
(74) *Attorney, Agent, or Firm* — Cowan, Liebowitz & Latman, P.C.; Mark Montague

(57) ABSTRACT

A linear position measuring system (10) and a method for determining a position of a carriage in relation to a slide rail (12), with an incremental scale (14) placed along the slide rail (12) and a scanner secured to the slide scale. The scanner is designed to scan a plurality of incremental markings along the incremental scale (14), wherein the incremental markings can be scanned as an essentially analog signal progression. The scanner is designed to scan the incremental markings with a variable scanning frequency. The scanning frequency can be adaptively varied in relation to a currently acquired frequency of the analog signal progression, wherein the variable scanning frequency measures at least twice the currently acquired frequency of the analog signal progression.

16 Claims, 2 Drawing Sheets

LINEAR POSITION MEASURING SYSTEM AND METHOD FOR DETERMINING THE POSITION OF A CARRIAGE IN RELATION TO A SLIDE RAIL WITH AN INCREMENTAL SCALE PLACED ALONG THE SLIDE RAIL AND A SCANNER SECURED TO THE SLIDE SCALE

REFERENCE TO RELATED APPLICATION

This application claims priority to European Patent Application No. 11405269.9, filed Jun. 10, 2011, the disclosure of which is incorporated herein by reference.

BACKGROUND OF THE INVENTION

The invention relates to a linear position measuring system and to a method for determining the position of a carriage in relation to a slide rail.

For example, systems for determining the position of a carriage in relation to a slide rail of the aforementioned kind are used in combination with guide systems, e.g., linear guides, which encompass a first body and a second body guided on the first body that can move relative to the first body, and here have the job of making it possible to determine the position of the second body relative to the first body. To this end, for example, a measuring scale of the respective device for determining a position can be fixed in place relative to the first body, for example, and a respective scanner can be fixed in place relative to the second body.

For example, linear position measuring systems for determining an absolute position are known in the art, which encompass the measuring scale marked with measuring points, and a scanner that can move relative to the measuring scale for scanning the respective measuring points. For example, these measuring points consist of one or more acquirable markings to identify a position. The markings can be acquired optically or magnetically, for example.

In the case of optical scanning, the scanner encompasses a sensor for acquiring an image of the measuring points and providing signals making it possible to determine the position of the scanner relative to the measuring scale. In the case of magnetic scanning, the scanner encompasses a magnetic field sensor for acquiring a magnetic field progression of individual permanent magnets, which in this case make up the measuring points of the measuring scale.

Depending on the respective measuring scale (optical/magnetic), these types of systems can be used, for example, to measure a relative change in the position of the scanner in relation to an initial position.

To reach a point where these types of systems become able to measure relative changes in position of the scanner in relation to the measuring scale, for example, the respective measuring scale can be designed as an incremental scale, and consequently acquire a sequence of several identical, periodically arranged markings spaced apart at equal distances along a prescribed line or measuring scale. For example, to enable the optical scanning of such an incremental measuring scale, the scanner can project an optical image of the respective markings onto a sensor in the form of a photoelectric detector. To measure relative changes in position of the scanner in relation to the measuring scale, the scanner is moved along the track of markings. Moving the scanner here causes a signal to change periodically, for example providing information about how many markings the scanner passes by within a predetermined time.

In sum, the respective change in the relative position of the scanner can be determined by scanning the measuring points or incremental markings of an incremental measuring scale. So-called incremental position encoders having a comparatively simple design and a high resolution are used for this purpose.

Scanners in known linear position measuring systems must be continuously supplied with external electrical power to prevent the loss of stored information about the respective position of the scanner. Even just a brief power interruption without any power buffer would cause information about the respective position of the scanner to be lost. As a consequence, even after the external power supply is resumed, the scanner would output erroneous information about the position, or none at all. In order to return to flawless operation from this state, the carriage would have to undergo a time-intensive recalibration in relation to the slide rail.

As known, scanners are equipped with a mobile (internal) power source, for example a battery or accumulator, which at least intermittently supplies power to a data storage device of the scanner to store information about position given an interruption in external power supply. The interruption in external power supply can here be bridged, thereby ensuring the flawless operation of the external power supply for the duration of the interruption and even beyond.

The maximum time for which the power can be bridged depends on the capacity of the mobile power source. As the capacity of the mobile power source grows (holding power consumption constant), so does the maximum time for which the interruption in external power supply can be bridged, too. The disadvantage here is that a rising capacity for the mobile power source is accompanied by an increase in its costs. In addition, the use of mobile power sources having an elevated capacity is also associated with an increased weight and/or increased space requirement. In particular the two last-mentioned factors have an overall negative impact on the operation of the linear position measuring system. For example, the increased weight of the mobile power source diminishes the overall acceleration of the carriage.

OBJECTS AND SUMMARY OF THE INVENTION

The object of the present invention is to create a linear position measuring system and a method for determining a position of a carriage in relation to a slide rail, which maximizes the time for which the power can be bridged to the scanner while maintaining the constant, reliable operation of the position measuring system.

This object is achieved by the features embodiments of the present invention.

A linear position measuring system for determining a position of a carriage in relation to a slide rail contains an incremental scale marked along the slide rail and a scanner secured to the carriage. The scanner is designed to scan a plurality of incremental markings along the incremental scale, wherein the incremental markings can be scanned as an essentially analog signal progression. The scanner is designed to scan the incremental markings with a variable scanning frequency. According to the invention, the scanning frequency can be adaptively changed in relation to a currently acquired frequency of the analog signal progression, wherein the variable scanning frequency measures at least twice the currently acquired frequency of the analog signal progression.

The linear position measuring system is able to carry out a scanning routine given a temporally variable scanning frequency. The resultant advantage is that the scanning frequency can be reduced as much as possible, while still remaining largely in compliance with the scanning theorem (Nyquist rate). This reduced scanning frequency is accompanied by a decrease in power consumption by the scanner. The key advantage to this is that power supply to the scanner can now be bridged via batteries or accumulators provided on the carriage or scanner given an interruption in the external power supply, wherein the time for which the power can be bridged is far longer by comparison to conventionally known linear position measuring systems. This ensures that the scanner will continue operating uninterruptedly, even during a prolonged power interruption and beyond, i.e., after the interruption in power has ended and external power is again being supplied to the scanner.

This advantage here does not come at the expense of compromises in terms of the reliability and precision with which the position is determined. The position can still be determined with a high level of precision even if the carriage suddenly accelerates to a speed that is very high by comparison to previous speeds, e.g., due to impacts on the linear position measuring system and/or scanner. In this case, the rapid rise in the currently acquired frequency of the analog signal progression is detected, and in response the scanning frequency is immediately increased in relation to this rise. This ensures the reliability of position determination.

The scanner is preferably designed to determine the current frequency of the analog signal progression by scanning with a second scanning frequency that is higher than the variable scanning frequency. This method makes it possible to instantly and reliably detect an increase in speed of the carriage, and thus raise the variable scanning frequency accordingly. By implication, a decrease in speed of the carriage can be detected, and the variable scanning frequency can consequently be lowered accordingly. For example, the correlation between the variable scanning frequency and second scanning frequency can measure 1 to 10.

The scanner is preferably designed to carry out the second scanning routine after the respective scanning with the variable scanning frequency has concluded. As a result, changes in carriage speed can be instantly detected, making it possible to adjust the variable scanning frequency directly to the altered speed. Due to this short response time, the carriage position can be reliably acquired even after sudden speed changes, for example caused by impacts on the linear position measuring system.

The scanning frequency can preferably be linearly or incrementally varied. This ensures that the variable scanning frequency is kept low in those operating modes of the linear position measuring system in which the carriage is moved at a relatively low speed. Since the power consumed for scanning is associated with the scanning frequency, power consumption in these operating modes is also far lower than in linear position measuring systems from prior art. However, as soon as it is ascertained that the frequency of the analog signal progression is rising, e.g., in response to an increase in the speed (acceleration) of the carriage, the scanning frequency is linearly or incrementally elevated. While this does increase the power consumption by the scanner, the reliability required to dependably acquire all incremental markings is left intact. If the speed of the carriage decreases from this state (delay), the scanning frequency is also diminished again. This leads to an overall reduction in the power consumption by the scanner. Let it be mentioned that the linear or incremental change in the variable scanning frequency in response to the respective currently acquired frequency of the analog signal progression must always be measured in such a way that the respective scanning frequency corresponds to at least twice the currently acquired frequency of the analog signal progression. This ensures compliance with the scanning theorem (Nyquist rate), serving as guarantor for reliable position determination.

The scanner preferably contains a comparator, which compares a frequency value equal to the scanning frequency with a frequency value corresponding to twice the currently acquired frequency of the analog signal progression, wherein the scanner is designed in such a way, subject to an added predetermined safety clearance value, as to increase the variable scanning frequency if the comparator has found an increase in the current frequency, and decrease the variable scanning frequency if the comparator has found a decrease in the current frequency.

This makes it possible for the scanner to always scan the linear position measuring system with a frequency at least twice as high as the frequency of the analog signal progression. While observing this criterion, the scanning frequency is at the same time adaptively set as low as possible in relation to the frequency of the analog signal progression, and hence to the speed of the carriage.

By comparison to linear position measuring systems from prior art, in which the scanning frequency is statically adjusted to such a (high) level that the maximum speed of the carriage is always covered, this offers hitherto unprecedented ways in which to save energy. This is what even makes it possible to reliably supply power to the scanner from a mobile power source, for example at least one battery or an accumulator, over a far longer period of time than in prior art given an interruption in external power supply. This type of mobile power source can be directly included on the scanner.

The safety clearance value is preferably equal to a value ranging from 5 to 25%. This makes it possible to adaptively adjust the scanner to the quality requirements placed on the linear position measuring system in terms of accuracy of position determination. It generally holds true that the accuracy of position determination by the scanner in relation to the slide rail rises as the safety clearance value gets increasingly higher. At the same time, the power consumption of the scanner also increases. This process of balancing the accuracy of position determination and power consumption can be adaptively tailored to the respective area of application for the linear position measuring system.

The incremental markings are preferably designed as individual permanent magnets, whose respective magnetic field strength progression can be scanned by the scanner. This enables particularly accurate scanning, since magnetic field scanning is especially insusceptible to interference by comparison to other scanning methods. In addition, scanning can take place at an especially fine resolution, since the permanent magnets can have a particularly narrow width in comparison to other configurations for incremental markings.

The incremental markings are preferably designed as optical markings, which can be optically scanned by the scanner. In this method, optically detectable markings applied to the incremental scale are scanned via optical reading heads of the scanner. This approach toward scanning is especially cost-effective to realize in comparison with other scanning methods.

The aforementioned object is also achieved by means of a method for determining a position of a carriage in relation to a slide rail. In this method, a scanner secured to the carriage scans a plurality of incremental markings. These incremental markings are placed along an incremental scale, wherein this incremental scale is situated along the slide rail. The incremental markings are here scanned as an essentially analog signal progression. The incremental markings are scanned with a variable scanning frequency. According to the invention, the scanning frequency is adaptively variable in relation to a currently acquired frequency of the analog signal progression, wherein the variable scanning frequency is adjusted in at least such a way as to measure twice the currently acquired frequency of the analog signal progression.

One advantage to scanning with a variable scanning frequency is that the scanning frequency can be reduced as much as possible. The scanning frequency is here reduced in compliance with the scanning theorem (Nyquist rate). As a consequence, the scanning rate frequency is always at least twice as high as the frequency of the signal progression to be scanned. Reducing the scanning frequency also decreases the power consumption by the scanner. Therefore, power supply to the scanner can now be bridged via batteries or accumulators provided on the carriage or scanner given an interruption in the external power supply.

The current frequency of the analog signal progression is preferably determined through scanning with a second scanning frequency that is higher than the variable scanning frequency. As a result, an increase or decrease in the speed of the carriage is reliably detected, making it possible to increase or decrease the variable scanning frequency accordingly. The scanning accuracy of the linear position measuring system thus remains at the same high level, so that the position can continue to be determined in a highly precise manner even if the carriage suddenly starts moving at a very high speed (acceleration). For example, this type of sudden acceleration can result from impacts on the linear position measuring system and/or scanner itself. In this case, a rapid rise in the currently acquired frequency of the analog signal progression is detected by scanning with the second scanning frequency. In response to this detection, the scanning frequency is elevated in direct relation to this rise.

The second scanning routine is preferably carried out after the respective scanning with the variable scanning frequency has concluded. One advantage lies in being able to thereby instantly acquire changes in carriage speed, making it possible to adjust the variable scanning frequency directly in relation to the altered speed of the carriage. Thanks to this short response time, the carriage position can be reliably acquired even given sudden accelerations.

The variable scanning frequency is preferably changed linearly or incrementally. Given the acquisition of a change in the frequency of the analog signal progression, for example caused by a sudden acceleration of the carriage, the scanning frequency is linearly or incrementally increased. As a consequence, all incremental markings can continue to be acquired while remaining in compliance with the scanning theorem. If the carriage speed changes proceeding from this state, the scanning frequency is also directly linearly or incrementally decreased. Overall power consumption by the scanner is reduced as a result. This proves especially advantageous if the external power supply is interrupted and the power is bridged over this time span by means of a power source provided on the carriage or scanner, for example a battery or an accumulator. The maximum duration of this energy bridging process is lengthened by comparison to known position measuring systems.

Subject to the addition of a predetermined safety clearance value, a comparator is preferably used for comparing a frequency value corresponding to the scanning frequency with a frequency value corresponding to twice the currently acquired frequency of the analog signal progression. The method further involves the steps of increasing the variable scanning frequency if it is found that the current frequency has increased, and decreasing the variable scanning frequency once it is found that the current frequency has decreased.

The comparison step performed by the comparator allows the scanner of the linear position measuring system to always scan the analog signal progression in relation to speed with a frequency measuring at least twice the frequency of the analog signal progression. While continuing to remain in compliance with this criterion, the scanning frequency is adaptively adjusted as slightly as possible to the frequency of the analog signal progression, and hence to the speed of the carriage.

The safety clearance value is preferably set to a range of between 5 and 25%. Setting the safety clearance value to a figure within this range enables an adaptive adjustment between a required accuracy for position determination and required power consumption with respect to the respective field of application for the linear position measuring system. An increasingly elevated safety clearance value also raises the accuracy and reliability with which the position is determined by the scanner. However, power consumption by the scanner also rises in the process, thereby by implication diminishing the maximum duration for which the power is bridged by the power source provided on the carriage.

The incremental markings are preferably designed as individual permanent magnets, whose respective magnetic field strength progression is scanned by the scanner. Using adjacently situated permanent magnets as incremental markings ensures a particularly accurate scanning, since their magnetic field scanning is especially insusceptible to interference by comparison to other scanning methods. In addition, scanning takes place at an especially fine resolution, since the permanent magnets have a particularly narrow width in comparison to other configurations for incremental markings.

The incremental markings are preferably designed as optical markings, which are optically scanned by the scanner. In this method, optically detectable markings applied to the incremental scale are scanned via optical reading heads of the scanner. This approach toward scanning is especially cost-effective to realize in comparison to other scanning methods.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE INVENTION

Figure 1:
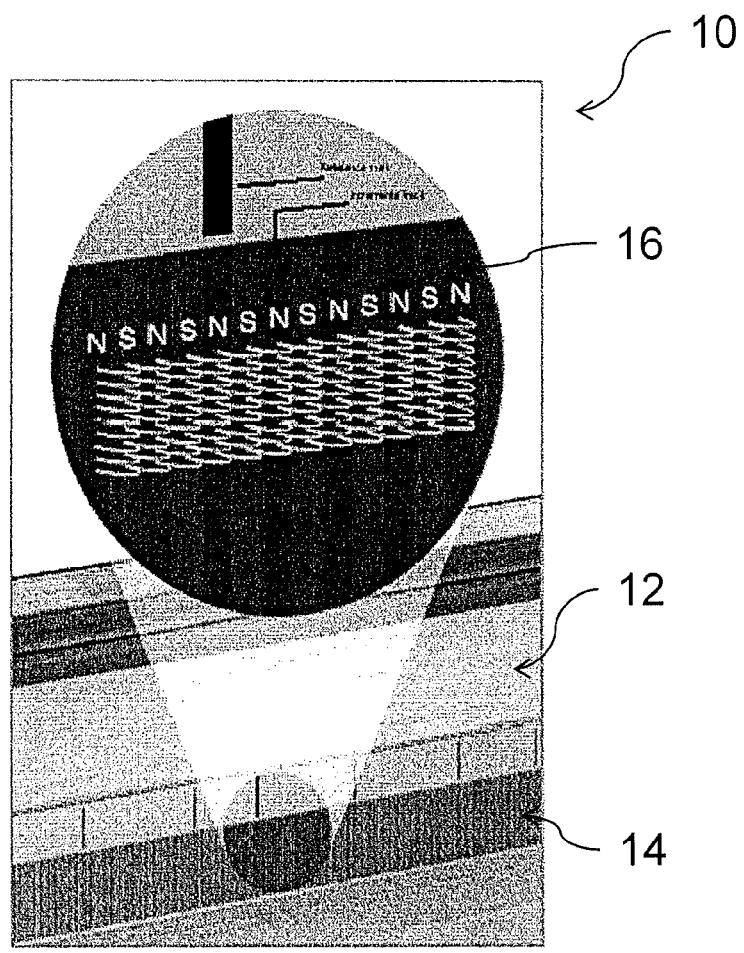
FIG. 1 is a detailed view of a linear position measuring system.

FIG. 1 presents a detailed view of a linear position measuring system 10, which depicts a magnified flank section of a slide rail 12 of the linear position measuring system 10. The slide rail 12 is used to guide a carriage, to which a scanner is fixedly secured (neither is shown). An incremental scale 14 is applied to the flank of the slide rail 12.

The incremental scale 14 consists of several adjacent permanent magnets 16, which are alternately aligned in the N-S, N-S, etc. direction. By way of illustration, the resultant magnetic field progressions are schematically depicted.

In order to be able to measure relative changes in position of the scanner in relation to the incremental scale 14 (and hence the slide rail 12), the carriage with the scanner secured thereto is moved along the track of permanent magnets 16. The scanner movement here results in the acquisition of a periodic change in a measuring signal in response to the magnetic field progression of the individual permanent magnets 16. This periodic change in the measuring signal provides information about the number of permanent magnets 16 by which the scanner was moved within a known time period. This in turn gives an indication of the distance traversed by the carriage in relation to the slide rail 12 and time.

The individual permanent magnets 16 must here be scanned in an especially reliable manner, since a misinterpretation would lead to erroneous information about the position of the carriage in relation to the slide rail 12.

Figure 2:
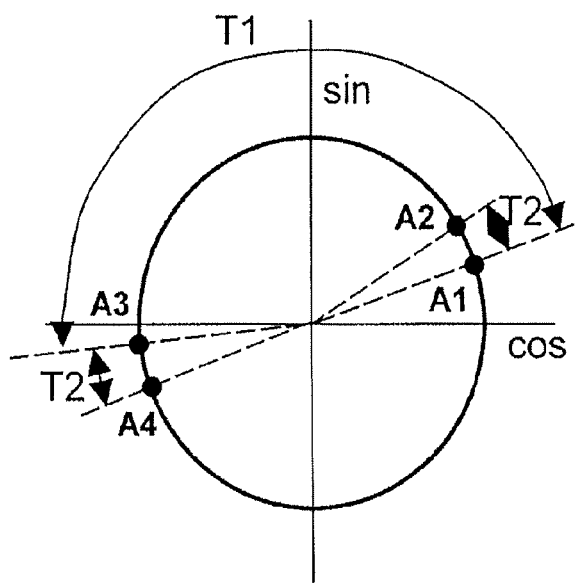
FIG. 2 is a diagram for explaining the time intervals of scanning times.

FIG. 2 shows a diagram for explaining how scanning times are set. According to the invention, the incremental markings are adaptively scanned with a variable scanning frequency, which can be varied in relation to a currently acquired frequency of the analog signal progression. The variable scanning frequency must here measure at least twice the currently acquired frequency of the analog signal progression. In the example shown on the figure, the traversed distance and speed of the carriage in relation to the slide rail are measured by simultaneously scanning sin and cos signals of the permanent magnets. According to the scanning theorem, the scanning frequency (1/T1) must here be at least twice as high as the measured frequency of the analog signal progression.

In terms of the diagram shown on FIG. 2, this means that the angle represented by T1 must have a value less than 180°. If this angle is exceeded, the scanner interprets the enhancement to 360° as a movement by the carriage in the opposite direction.

Conventional linear position measuring systems operate with scanners that are supplied with power externally via electrical lines. Given an interruption in external power supply, for example caused by a failure of the external power supply system, an interruption in the feed line, or deactivation of the external supply system, a mobile power source is provided, for example a battery or accumulator, which is secured to the carriage or directly to the scanner. A power outage involving the external power supply system is then directly bridged by power supplied via the mobile power source. This prevents the loss of any stored information about the respective currently acquired position of the carriage. The energy saved as described above significantly increases the maximum time for which the mobile power source is rated to supply enough power to the scanner.

Therefore, in order to save the required amount of energy, it is suggested that the scanning frequency 1/T1 of the scanner be reduced as much as possible. To this end, the scanning interval T1 is changed in relation to the speed of movement. As the angle traversed within time interval T1 approaches a value of 180°, the time interval T1 is reduced accordingly, or the scanning frequency 1/T1 is increased. A safety clearance value can be implemented, which takes hold at an adjustable value before the angle of 180° is reached. As a result, the scanning frequency is already increased earlier, so as to reliably remain in compliance with the scanning theorem in so doing. This increase in scanning frequency can take place incrementally (iteratively) or linearly.

At high accelerations, it may happen that the angle in the current scanning cycle will exceed the value of 180°, even though this limit had not yet been exceeded in the preceding cycle. To enable detection of this case as well, each scanning process A1 and A3 is followed by a scanning process A2 and A4 at a considerably shorter time interval T2, as illustrated by the example depicted on FIG. 2. Scanning in this way at a higher scanning frequency 1/T2 permits the acquisition of correspondingly higher speeds of motion (frequencies of sin and cos signals).

In the example presented on FIG. 2, time interval T1 corresponds to ten times time interval T2 (T2=T1/10). In keeping with this selected correlation between T2 and T1, the distance traversed within time interval T2 (time interval between scanning processes A3 and A4) can only assume a value corresponding to 1/10 of the limit. If this value is higher, the distance measured within time interval T1 has been incorrectly determined, since the scanning theorem was violated. However, this error can advantageously be detected, and this incorrectly measured distance can be discarded.

In this way, measuring errors can be recognized and avoided, without having to continuously scan with the high scanning frequency 1/T2. This yields a very substantial energy savings, thereby enabling the prolonged use of batteries or accumulators in the scanner by comparison to known position measuring systems given an interruption in the external power supply.

The present invention has been described in the context of a number of embodiments, and multiple variations and examples thereof. It is to be understood, however, that other expedients known to those skilled in the art or disclosed herein may be employed without departing from the spirit of the invention.

Therefore, it is intended that the appended claims be interpreted as including the embodiments described herein, the alternatives mentioned above, and all equivalents thereto.

What is claimed is:

1. A linear position measuring system for determining a position of a carriage in relation to a slide rail, with an incremental scale including a plurality of incremental markings that are placed along the slide rail and a scanner secured to the carriage, wherein the scanner is designed to scan a plurality of incremental markings along the incremental scale, wherein the incremental markings are scanned as an analog signal progression, wherein the scanner is designed to scan the incremental markings with a variable scanning frequency, characterized in that the scanning frequency is adaptively varied in relation to a currently acquired frequency of the analog signal progression, wherein the variable scanning frequency measures at least twice the currently acquired frequency of the analog signal progression.

2. The linear position measuring system according to claim 1, in which the scanner is designed to determine the current frequency of the analog signal progression by scanning with a second scanning frequency that is higher than the variable scanning frequency.

3. The linear position measuring system according to claim 2, in which the scanner is designed to carry out the second scanning routine after the respective scanning with the variable scanning frequency has concluded.

4. The linear position measuring system according to claim 1, in which the variable scanning frequency is linearly or incrementally varied.

5. The linear position measuring system according to claim 1, in which the scanner compares a frequency value equal to the scanning frequency with a frequency value corresponding twice the currently acquired frequency of the analog signal progression, and the scanner is designed in such a way, subject to an added predetermined safety clearance value, as to:

increase the variable scanning frequency if the scanner has found an increase in the current frequency, and decrease the variable scanning frequency if the scanner has found a decrease in the current frequency.

6. The linear position measuring system according to claim 5, in which the safety clearance value measures a value ranging from 5 to 25%.

7. The linear position measuring system according to claim 1, in which the incremental markings are designed as individual permanent magnets, whose respective magnetic field strength progression is scanned by the scanner.

8. The linear position measuring system according to claim 1, in which the incremental markings are designed as optical markings, which are optically scanned by the scanner.

9. A method for determining a position of a carriage in relation to a slide rail, with an incremental scale including a plurality of incremental markings that are placed along the slide rail and a scanner secured to the carriage, wherein the scanner scans a plurality of incremental markings along the incremental scale, wherein the incremental markings are scanned as an analog signal progression, wherein the incremental markings are scanned with a variable scanning frequency, characterized in that the scanning frequency is adaptively varied in relation to a currently acquired frequency of the analog signal progression, wherein the variable scanning frequency is set in such a way as to measure twice the currently acquired frequency of the analog signal progression.

10. The method according to claim 9, in which the current frequency of the analog signal progression is determined by scanning with a second scanning frequency that is higher than the variable scanning frequency.

11. The method according to claim 10, in which the second scanning routine is carried out after the respective scanning with the variable scanning frequency has concluded.

12. The method according to claim 9, in which the variable scanning frequency is linearly or incrementally varied.

13. The method according to claim 9, in which the scanner contains a comparator, subject to an added predetermined safety clearance value, compares a frequency value equal to the scanning frequency with a frequency value corresponding to twice the currently acquired frequency of the analog signal progression, in the following steps:

increase the variable scanning frequency if it is found that the current frequency has increased, and decrease the variable scanning frequency if it is found that the current frequency has decreased.

14. The method according to claim 13, in which the safety clearance value is set to a range of between 5 and 25%.

15. The method according to claim 9, in which the incremental markings are designed as individual permanent magnets, whose respective magnetic field strength progression is scanned by the scanner.

16. The method according to claim 9, in which the incremental markings are designed as optical markings, which are optically scanned by the scanner.

* * * * *